(12) United States Patent
Schoonebeek et al.

(10) Patent No.: US 8,574,539 B2
(45) Date of Patent: Nov. 5, 2013

(54) PROCESS FOR SELECTIVE OXIDATION OF HYDROGEN SULPHIDE

(75) Inventors: Ronald Jan Schoonebeek, Amsterdam (NL); Sipke Hidde Wadman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/579,368

(22) PCT Filed: Feb. 17, 2011

(86) PCT No.: PCT/EP2011/052341
§ 371 (c)(1),
(2), (4) Date: Sep. 10, 2012

(87) PCT Pub. No.: WO2011/101406
PCT Pub. Date: Aug. 25, 2011

(65) Prior Publication Data
US 2013/0183217 A1    Jul. 18, 2013

(30) Foreign Application Priority Data
Feb. 18, 2010    (EP) ..................................... 10154019

(51) Int. Cl.
*C01B 17/04*    (2006.01)
(52) U.S. Cl.
USPC .................................... 423/573.1; 423/574.1
(58) Field of Classification Search
USPC ........................................... 423/573.1, 574.1
See application file for complete search history.

(56) References Cited

U.S. PATENT DOCUMENTS

| 4,280,990 A | 7/1981 | Jagodzinski et al. .......... 423/574 |
| 4,908,201 A | 3/1990 | Cabanaw ....................... 423/576 |
| 5,766,567 A | 6/1998 | Voirin et al. ................ 423/574.1 |
| 7,374,742 B2 * | 5/2008 | Geosits et al. ............. 423/573.1 |
| 7,824,638 B2 * | 11/2010 | Rameshni et al. .......... 423/242.1 |
| 2005/0100504 A1 | 5/2005 | Geus et al. ................. 423/573.1 |

FOREIGN PATENT DOCUMENTS

| GB | 1307716 | 2/1973 | .............. C01B 17/04 |
| WO | WO2004007358 | 1/2004 | .............. C01B 17/04 |

OTHER PUBLICATIONS

Clark, P.D.; "Controlling $CO_2$ emissions in large scale sour gas developments"; Alberta Sulphur Research Limited, Quarterly Bulletin 145; vol. XLV, No. 1; pp. 45-55; Apr.-Jun. 2008.
Bacon, R.F. et al.; "The Viscosity of Sulfur"; CRC Handbook of Chemistry and Physics, 56th edition, J. Am. Chem. Soc., vol. 65; pp. 639-648. Apr. 1943.
Touro et al.; "Viscosity-Chain Length Relationship in Molten Sulfur Systems"; J. Phys. Chem.; vol. 70, No. 1; pp. 239-241; Jan. 1966.

* cited by examiner

*Primary Examiner* — Timothy Vanoy
(74) *Attorney, Agent, or Firm* — Charles W. Stewart

(57) ABSTRACT

The present invention provides a process for the selective oxidation of hydrogen sulphide in a hydrogen sulphide-containing hydrocarbon and/or hydrogen feed gas to elemental sulphur in a reaction zone containing a Claus catalyst, comprising the steps of: i) reacting in the reaction zone the hydrogen sulphide in the hydrogen sulphide-containing hydrocarbon and/or hydrogen feed gas with sulphur dioxide at a pressure in the range of from 4 to 200 bar (absolute) and a temperature in the range of from 120 and 160° C., such that the elemental sulphur formed is essentially in liquid form; ii) contacting the catalyst with a reducing atmosphere at elevated temperatures.

12 Claims, 2 Drawing Sheets

PROCESS FOR SELECTIVE OXIDATION OF HYDROGEN SULPHIDE

PRIORITY CLAIM

The present application claims priority from PCT/EP2011/052341, filed 17 Feb. 2011, which claims priority from EP 10154019.3, filed 18 Feb. 2010.

FIELD OF THE INVENTION

The invention relates to a process for the selective oxidation of hydrogen sulphide in a hydrogen sulphide-containing hydrocarbon and/or hydrogen feed gas to elemental sulphur.

BACKGROUND OF THE INVENTION

A known industrial process for the conversion of hydrogen sulphide is the so-called Claus process. In a Claus process hydrogen sulphide is reacted with sulphur dioxide to elemental sulphur and water according to the Claus reaction.

$$2\ H_2S + SO_2 \Leftrightarrow 2\ H_2O + 3/n\ S_n \qquad (1)$$

Conventionally, this reaction is performed in several stages at temperatures in the range of from 200 to 240° C. and at near atmospheric pressures.

In conventional Claus processes, hydrogen sulphide is first separated from a hydrocarbon gas stream, e.g. by a solvent extraction process. After solvent regeneration, a hydrogen sulphide-rich gas is obtained, which is dealt with in the Claus process. About one third of the hydrogen sulphide in this gas is oxidized with air to sulphur dioxide in a burner, according to:

$$2\ H_2S + 3\ O_2 \Rightarrow 2\ H_2O + 2\ SO_2 \qquad (2)$$

The sulphur dioxide subsequently reacts with the remaining hydrogen sulphide to elemental sulphur according to reaction (1).

The hydrogen sulphide has first to be separated from the remainder of the gas to prevent combustion of the hydrocarbons (or hydrogen) in the feed gas. It would be advantageous if hydrogen sulphide could be selectively oxidized, i.e. without the need to separate it from the remainder of the gas.

In P.D. Clark, Controlling $CO_2$ emissions in large scale sour gas developments, Alberta Sulphur Research Limited, Quarterly Bulletin of ASRL, June 2008, page 45 to 55, a high pressure Claus process is disclosed wherein a sour natural gas stream is processed to remove hydrogen sulphide, without the need to separate the hydrogen sulphide from the natural gas. In this process one third of sour gas is combusted with pure oxygen to provide a gas comprising sulphur dioxide, carbon dioxide and water, the remaining two thirds of the sour gas are passed through a carbon bed to remove mercaptans and any other contaminants. Subsequently, the sulphur dioxide and water-comprising gas and the mercaptan-depleted sour gas are provided to a reactor and allowed to react over an alumina catalyst.

In WO2004007358, a method is provided for removing hydrogen sulphide from synthesis gas, without the need for a prior separation of the sulphur compounds from the synthesis gas. An oxidant used in the method of WO2004007358 is sulphur dioxide. Suitable catalyst mentioned in WO2004007358, include alumina ($Al_2O_3$) and titania ($TiO_2$), which are two of the most used Claus catalyst. The examples of WO2004007358 only show the use of alumina catalyst.

The use of $TiO_2$ catalysts has a number of advantages over the use of alumina catalyst, one being that $TiO_2$ catalyses the hydrolysis of COS present in the feed stream. In conventional high temperature, low pressure Claus reactions, $TiO_2$ catalysts show little to no deactivation. Methods as disclosed in Clark et al. and WO2004007358 are operated at much lower temperatures and elevated pressures than conventional high temperature, low pressure Claus reactions. It has been found that under such conditions the catalyst does show deactivation and consequently a lower hydrogen sulphide conversion after prolonged operation times.

There is a need in the art for a process for the direct selective oxidation of hydrogen sulphide comprised in gaseous hydrocarbon or hydrogen-comprising streams using a Claus catalyst for prolonged times without observing significant loss of hydrogen sulphide conversion.

SUMMARY OF THE INVENTION

It has now been found that it is possible to operate a selective oxidation process or low temperature Claus process using a Claus catalyst for prolonged times without significant loss of hydrogen sulphide conversion by using an intermittent process wherein the catalyst is intermittently contacted with a reducing atmosphere.

Accordingly, the present invention provides a process for the selective oxidation of hydrogen sulphide in a hydrogen sulphide-containing hydrocarbon and/or hydrogen feed gas to elemental sulphur in a reaction zone containing a Claus catalyst, comprising the steps of:

i) reacting in the reaction zone the hydrogen sulphide in the hydrogen sulphide-containing hydrocarbon and/or hydrogen feed gas with sulphur dioxide at a pressure in the range of from 4 to 200 bar (absolute) and a temperature in the range of from 120 and 160° C., such that the elemental sulphur formed is essentially in liquid form;

ii) contacting the catalyst with a reducing atmosphere at elevated temperatures.

By contacting the Claus catalyst intermittently with a reducing atmosphere, any deposited anionic oxides of sulphur may be removed from the active sites of catalyst and the catalyst activity is maintained such that a deep-desulphurisation, i.e. high conversion of sulphur components, is achieved for prolonged operation times. Reference herein to a reducing atmosphere, also known as a reduction atmosphere, is to an atmosphere facilitating reduction of compounds, in which oxidation is prevented by limitation, preferably absence, of any oxygen and other oxidising gas or vapour content, including sulphur dioxide. The reduction of compounds is facilitated by the presence of a reducing compound, such as a reducing gas or vapour, in the atmosphere.

DETAILED DESCRIPTION OF THE INVENTION

Figure 1:
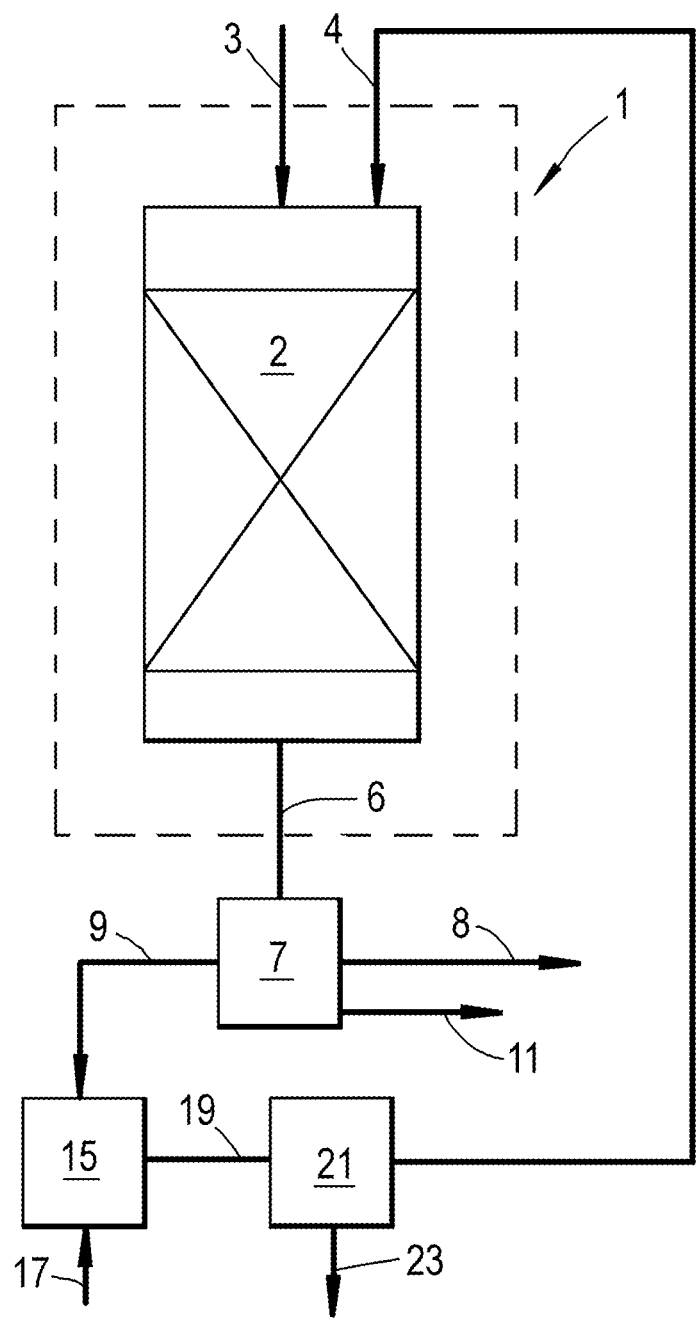
In FIG. 1, a process scheme is shown suitable for performing the process according to the invention.

In step (i) of the process according to the invention hydrogen sulphide is selectively oxidized to sulphur according to exothermic reaction (1). The reaction is selective in the sense that compounds other than hydrogen sulphide, such as hydrocarbons or hydrogen, are not or hardly oxidized. This has the advantage that there is no need to separate hydrogen sulphide from the other gas components, such as in conventional Claus processes.

Reference herein to a hydrocarbon and/or hydrogen feed gas is to a gas comprising hydrocarbons, molecular hydrogen or both. The hydrocarbon and/or hydrogen feed gas is also referred to hereinbelow as feed gas.

A hydrogen sulphide-depleted gas is obtained from step (i) of the process. Reference herein to a hydrogen sulphide-depleted gas is to a gas that contains less hydrogen sulphide than the hydrogen sulphide-containing gas provided to step (i) of the process. The hydrogen sulphide-depleted gas is also referred to as product gas or as it be hydrogen product gas, i.e. a product gas comprising at least hydrogen, or hydrocarbon product gas, i.e. a product gas comprising at least hydrocarbon.

Another advantage of the process according to the invention is that no additional sulphur dioxide is formed during the conversion of the hydrogen sulphide in step (i). The hydrogen sulphide is selectively oxidized to elemental sulphur.

Elemental sulphur is formed essentially in liquid form. By ensuring that the sulphur formed is in a liquid form, the catalyst remains accessible to the reactants and clogging of the catalyst or catalyst pores is prevented.

Reference herein to a Claus catalyst is to any catalyst suitable for catalysing the Claus reaction. Such catalyst are well known in the art and described extensively. Most common Claus catalysts are based on $Al_2O_3$ or $TiO_2$. In the invention according to the present invention the preferred catalyst is a $TiO_2$-comprising catalyst.

By using a $TiO_2$ catalyst any COS or $CS_2$ present in the feed gas, the sulphur dioxide-containing gas supplied to the reactor or formed in the reactor is converted to $CO_2$, water and elemental sulphur. Both COS and $CS_2$ are catalytically hydrolysed in the presence of the $TiO_2$ catalyst to $CO_2$ and hydrogen sulphide. The hydrogen sulphide is subsequently reacted with sulphur dioxide, thereby reducing the need for a separate process to remove and/or convert COS or $CS_2$ either prior to or subsequent to the process according to the invention.

During the reaction between hydrogen sulphide and sulphur dioxide, sulphation of the Claus catalyst takes place. Reference herein to the sulphation of the Claus catalyst is to the deposition of $SO_4^{2-}$ anions on the active sites of the catalyst by formation of sulphate compounds. Other anionic oxides of sulphur may be formed, including, but not limited to, for instance $S_2O_3^{2-}$. The behaviour of these other anionic oxides of sulphur is comparable to that of $SO_4^{2-}$, therefore any reference to $SO_4^{2-}$ herein below should be interpreted as a reference to any anionic oxide of sulphur.

In case of the preferred catalyst, i.e. a $TiO_2$— comprising catalyst, the deposition of $SO_4^{2-}$ anions on the active sites of the $TiO_2$ comprised in the catalyst may result in the formation of $TiO(SO_4)$ compounds. For an alumina catalyst one of the compounds formed on the active sites of the catalyst may be for instance $Al_2O_2(SO_4)$.

A catalyst of which at least part of the active sites are sulphated, in particular in the case of a $TiO_2$— comprising catalyst sulphated to $TiO(SO_4)$, is further also referred to a sulphated catalyst.

Without being bound to any particular theory, it is believed that the feed gases provided to the process may also comprise oxygen, albeit in very low concentrations, and this oxygen may contribute in the sulphation of the catalyst.

Sulphation of the catalyst may result in a reduced activity of the catalyst.

It has now been found that sulphation, i.e. the deposition of $SO_4^{2-}$, of the Claus catalyst can be reversed by intermittently contacting the sulphated catalyst with a reducing atmosphere, i.e. step (ii) of the process according to the invention, preferably before the activity of the catalyst is significantly affected. By contacting the catalyst with a reducing atmosphere, the $SO_4^{2-}$ anions deposited on the active sites of the catalyst are reduced and for example sulphated $TiO_2$ compounds, such as $TiO(SO_4)$, are effectively converted to back to $TiO_2$. As a result, the lifespan of the catalyst is significantly increased. Depending on the composition of the reducing atmosphere, for instance one or more of elemental sulphur, hydrogen sulphide, sulphur dioxide, water and carbon dioxide may be formed as product of the reduction of $SO_4^{2-}$.

The reducing atmosphere may be any atmosphere that can effectuate reduction of the $SO_4^{2-}$ deposited on the active sites of the sulphated catalyst. Preferably, the reducing atmosphere comprises a reducing agent, also referred to as reductant or reducer. Reference herein to a reducing agent is to a compound in a reduction-oxidation reaction that reduces another species, in particular anionic oxides of sulphur, more in particular $SO_4^{2-}$. In doing so, the reducing agents itself becomes oxidized, and is therefore the electron donor in the reduction-oxidation reaction. Any suitable reducing agent may be used, preferably the reducing agent is at least one of hydrogen sulphide, hydrogen, carbon monoxide, ammonia or elemental sulphur. Preferably, the reducing atmosphere comprises at least hydrogen sulphide as reducing agent. As the feed gas to the process already comprises hydrogen sulphide, hydrogen sulphide is readily available. Therefore, preferably the hydrogen sulphide-containing hydrocarbon or hydrogen feed gas is used to form at least part of the reducing atmosphere. In one preferred embodiment, the reducing atmosphere comprises a hydrogen sulphide-containing hydrocarbon feed gas. In this embodiment the reducing agent is hydrogen sulphide.

In another preferred embodiment, the reducing atmosphere comprises a hydrogen sulphide-containing hydrogen feed gas. In this embodiment, hydrogen sulphide and hydrogen may act as reducing agent.

In a further preferred embodiment, a hydrogen sulphide-containing hydrogen feed gas is first processed to remove hydrogen sulphide according to step (i) of the process according to the invention. Subsequently, at least part of the hydrogen product gas, which is hydrogen sulphide-depleted, is used to form at least part of the reducing atmosphere, which is contacted with the catalyst in step (ii). Optionally, the hydrogen product gas is first treated to reduce the sulphur dioxide content.

The reducing atmosphere is an atmosphere that comprises little or no oxidising agents, also referred to as oxidants. Such oxidising agents include but are not limited to oxygen, sulphur dioxide and sulphur trioxide. In case oxidising agents are present in the reducing atmosphere it is preferred that the molar ratio of reducing agent to oxidising agent is below the stoichiometric molar ratio of oxidising agent to reducing agent. Reference herein to the stoichiometric molar ratio of oxidising agent to reducing agent is to the molar ratio in which the oxidising agent would react with the reducing agent in a reduction-oxidation reaction. As mentioned herein above, it is preferred that little to no oxidising agent is present in the reducing atmosphere. Above the stoichiometric molar ratio of oxidising agent to reducing agent the atmosphere can no longer be considered being reductive, but rather becomes an oxidative atmosphere as is used in step (i) of the process. For very strong oxidising agents, even lower ratios are required. Preferably, the molar ratio of oxidising agent to reducing agent is below 0.8 times the stoichiometric ratio, more preferably in the range of from 0 to 0.4 times the stoichiometric molar ratio, even more preferably of from 0 to 0.2 times the stoichiometric molar ratio, still even more preferably, 0 to 0.02 times the stoichiometric molar ratio, still even more preferably 0 to 0.01 times the stoichiometric molar ratio. For instance in case of a sulphur dioxide oxidant and a hydrogen sulphide reductant, the molar ratio of sulphur oxide to hydrogen sulphide should be below 0.5, preferably below 0.4. Preferably, the molar ratio of sulphur dioxide to hydrogen sulphide is in the range from 0 to 0.2, more preferably of from 0 to 0.1, even more preferably 0 to 0.01, still even more preferably 0 to 0.005. At a molar ratio below 0.2, i.e. 0.4 times the stoichiometric molar ratio, the reducing atmosphere is oxidant lean and the reduction reaction of $SO_4^{2-}$ commences at an industrial rate.

Reference herein above to a molar ration of zero is to a reducing atmosphere that contains no oxidising agent.

Preferably, step (ii) includes contacting the sulphated catalyst with a reducing gas under such conditions that the $SO_4^{2-}$ anions are reduced to at least one of elemental sulphur, hydrogen sulphide, sulphur dioxide, water and carbon dioxide.

Preferably, the sulphated catalyst is contacted in step (ii) with the reducing atmosphere at a temperature in the range of from 150 to 300° C., preferably 160 to 250° C. The reaction rate, or kinetics, of the reduction of the $SO_4^{2-}$ anions deposited on the sulphated catalyst is favoured at higher temperatures. If the temperature is chosen too high, the structure of the catalyst may be affected. In case the reducing atmosphere comprises reducing agent and oxidising agent above a molar ratio of reducing agent to oxidising of 0.4 times the stoichiometric molar ratio, it is preferred to operate step (ii) at a temperature in the range of from 170 to 300° C. to further promote the kinetics of the reduction reaction over the oxidation reaction.

One of the possible reaction products of the reduction reaction of step (ii) may be elemental sulphur. At temperatures above approximately 160° C., the viscosity of the elemental sulphur produced increases. However, as the amount of reductant that needs to reach the surface for reduction of the $SO_4^{2-}$ on the sulphated catalyst is small this does not significantly influence the desulphation of the catalyst. Upon lowering of the temperature below 160° C., the viscosity of the elemental sulphur is decreased and the elemental sulphur can be transported from the catalyst surface. At higher temperatures, at least part of the produced sulphur evaporates and may be removed from the catalyst surface as sulphur vapour.

By following the consumption of the reducing agent in the reducing atmosphere it is possible to follow the extent of the desulphation of the catalyst. If little or no reducing agent is consumed any longer, it may be decided to resume step (i) of the process according to the invention.

One of the products of step (i) of the process according to the invention is liquid elemental sulphur. If it is intended to operate step (ii) of the process at a temperature above 160° C., it may be preferable to remove at least part of any liquid sulphur formed or otherwise present in step (i), prior to initiating step (ii) of the process. The liquid elemental sulphur can be removed by evaporation or by gravity flow. Optionally, the sulphur can be washed from the catalyst using a suitable washing agent. Examples of suitable washing agents include paraffins like n-pentane, n-hexane, n-heptane, n-octane and mixtures thereof, refinery hydrocarbon streams such as naphtha or kerosine, crude oil, toluene, other aromatic or naphthenic solvents, alkanol amines and sulfinol.

The reducing atmosphere may be contacted with the sulphated catalyst at any suitable pressure. Preferably, the reducing atmosphere is contacted with the catalyst at the pressure at which the reducing atmosphere, or the components forming the reducing atmosphere, are provided to the process. By doing so, the need to pre-pressurise or pre-depressurise the reducing atmosphere prior to contacting the atmosphere with the sulphated catalyst is reduced if not omitted. Preferably, the sulphated catalyst is contacted with the reducing atmosphere at a pressure of in the range of from 1 to 200 bar (absolute), more preferably of from 4 to 200 bar (absolute), even more preferably of from 5 to 150 bar (absolute), still even more preferably of from 5 to 150 bar(absolute).

In a preferred embodiment the pressure in step (i) and step (ii) are the same, i.e. the pressure applied in step (ii) differs no more than 10% from the pressure applied in step (ii) based on the pressure in step (i), preferably the pressure applied in step (ii) differs no more than 5% from the pressure applied in step (ii) based on the pressure in step (i). By using the same pressure in step (i) and step (ii), the pressure swing to which the process and process apparatus is subjected during the transition from step (i) to step (ii) and back from step (ii) to step (i) is reduced. In addition, this allows for the hydrogen sulphide-containing hydrocarbon and/or hydrogen feed gas to be used as the reducing agent in step (ii) without the need for a significant increase or decrease of the hydrogen sulphide-containing hydrocarbon and/or hydrogen feed gas pressure.

The reducing atmosphere or gases forming the reducing atmosphere may be any atmosphere or gas suitable for reducing oxidise of sulphur, in particular $5O_4^{2-}$ anions. Preferably, the reducing atmosphere is a gaseous atmosphere, comprising one or more gaseous reducing agents, preferably at least one of hydrogen sulphide, hydrogen or carbon monoxide. Preferably, the reducing atmosphere comprises in the range of from 1 ppmV (0.0001 vol %) to 100 vol % reducing agent, based on the total volume of the reducing atmosphere, more preferably of from 10 ppmV to 50 vol %, even more preferably 100 ppmV to 25 vol %.

When using a dedicated reducing atmosphere, tailored for the process according to the invention, the reducing atmosphere need only to comprise a low reducing agent content, ranging from the lower ppmV range to several vol %, preferably in the range of from 1 ppmV to 5 vol %, preferably 10 ppmV to 1 vol %, based on the total volume of the reducing atmosphere.

It will be appreciated that in case of a process wherein a synthesis gas, optionally a hydrogen sulphide-containing synthesis gas, is used to form the reducing atmosphere, the reducing atmosphere will comprise a very high content of reducing agent, theoretically up to 100 vol % for a synthesis gas consisting of hydrogen and carbon monoxide. In case, hydrogen sulphide-containing hydrocarbon (feed) gas is used to form the reducing atmosphere, the reducing atmosphere will comprise an intermediate content of reducing agent, ranging of from 1 to 80 vol %, preferably 2 to 25 vol % based on the total volume of the reducing atmosphere, depending on the origin and hydrogen sulphide content of the hydrocarbon gas.

The reducing atmosphere may also comprise inert gases, i.e. gases that do not react with either the $SO_4^{2-}$ anions deposited on the sulphated catalyst or the reducing agent under the process conditions of step (ii). Examples of such inert gases include but are not limited to hydrocarbons, in particularly methane, nitrogen, carbon dioxide, steam or argon.

Optionally, the reducing atmosphere may comprise a liquid, such as liquid elemental sulphur.

Suitable gases streams or mixtures for forming at least part of the gaseous reducing atmosphere include hydrogen sulphide-containing hydrocarbon gases, hydrogen sulphide-containing synthesis gases, other synthesis gases and hydrogen, carbon monoxide and/or hydrogen sulphide comprised in nitrogen and/or carbon dioxide based mixtures. Particular suitable gases streams or mixtures for forming at least part of the gaseous reducing atmosphere are the hydrogen sulphide-containing feed gas or hydrogen-sulphide depleted hydrogen gas obtained from step (i) of the process according to the invention, as these are readily available. Reference herein to a synthesis gas is to a gas comprising hydrogen and carbon monoxide obtained by reforming or partial oxidation of hydrocarbons, in particular methane, coal or biomass.

The reducing atmosphere may be a stagnant atmosphere or may be formed by a continuous fluid flow, preferably a continuous gaseous flow. In the case of the latter, the reducing atmosphere or gases forming the reducing atmosphere are preferably supplied to the reaction zone, optionally to one or more of the catalytic zones comprised in the reaction zone, operated according to step (ii) of the process in the reaction zone at a gas hourly space velocity in the range of from 100 to 100,000 Nl/kg/h (normal litres of gas per kilogram of catalyst in that zone per hour), more preferably of from 150 to 50,000 Nl/kg/h, even more preferably of from 200 to 5,000 Nl/kg/h. Reference herein to normal litres is to litres of gas at conditions of Standard Temperature and Pressure, i.e. 0° C. and 1 atmosphere. By using a continuous fluid flow to form the reducing atmosphere, the fluid flow can be used to provide heat to the reaction zone during step (ii) of the process.

In step (i) of the process according to the invention, hydrogen sulphide is selectively oxidised to elemental sulphur and water by reacting, i.e. oxidizing, the hydrogen sulphide with sulphur dioxide. Step (i) and step (ii) can be operated in cycles, i.e. in a sequence comprising step (i) and subsequently step (ii), which sequence is repeated one or preferably more times. The process according to the invention can be operated continuously.

In step (i) of the process according to the invention, a hydrogen sulphide-containing feed gas and a sulphur dioxide-containing gas are supplied to a reaction zone. The reaction zone may comprise one or more catalytic zones comprising a Claus catalyst. It is preferred that the hydrogen sulphide-containing feed gas and sulphur dioxide-containing gas comprise no more than 1 mol % of water based on the number of moles sulphur dioxide present in the sulphur dioxide-containing gas supplied to the reactor, preferably no more than 0.5 mol %, more preferably essentially no water. Water is one of the reaction products of the reaction between hydrogen sulphide and sulphur dioxide and any water present in the gases supplied to the reaction zone negatively influences the equilibrium of reaction (1), by drawing the equilibrium toward the reactants side.

Equally important, if the partial pressure of water is too high, condensation of liquid water may take place.

In the presence of liquid water, sulphurous acid may be formed as the sulphur dioxide dissolves in the liquid water. As a result, the pH in the reaction zone may be decreased. When operating in low pH environments, special consideration must be given to the construction materials due to corrosion phenomena. This may put constrains on the materials that can be used to construct the reactor and/or reaction zone and lead to an increased capital investment. As the reaction itself already produces water, any additional supply of water to the reactor zone should be limited, if not essentially prevented.

In step (i), the hydrogen sulphide and sulphur dioxide are contacted with the Claus catalyst, whereby the temperature of the catalytic zone is maintained in the range of from 120 to 160° C. In the catalytic zone, hydrogen sulphide is converted to elemental sulphur and water by reacting with the sulphur dioxide. By maintaining a temperature in the range of from 120 to 160° C., the sulphur formed during the reaction is essentially liquid. The melting temperature of elemental sulphur is 112 to 120° C., the exact value depending on the crystal structure of the sulphur (CRC Handbook of Chemistry and Physics, 56th edition, 1975-1976). Therefore, the process temperature in the at least one catalytic zone is at least 120° C. At a temperature of about 159° C., elemental sulphur starts to polymerize and forms a substance of a high viscosity that is difficult to remove from the pores or from the surface of a catalyst and may result in clogging and deactivation of the catalyst. It is known in the art, from for example Bacon et al. (R. F. Bacon and F. Fanelli, J. Am. Chem. Soc. 65 (1943) 639) and Touro et al. (J. Phys. Chem. 70 (1966) 239) that the presence of hydrogen sulphide influences the viscosity of sulphur. Thus, the exact viscosity increase with temperature will inter alia depend on the hydrogen sulphide concentration. In step (i) of the process according to the invention, the sulphur formed is essentially in liquid form. Essentially in liquid form means that the degree of sulphur polymerization is limited such that there is no build-up of highly viscous sulphur on the catalyst, i.e. sulphur which is so viscous that it prohibits access of the reactants to the catalytically active sites. Therefore, the temperature in the at least one catalytic zone is at most 160° C.

In step (i), the hydrogen sulphide reacts with the sulphur dioxide as shown in formula (1). This reaction is exothermic. Most of the heat released during the reaction is transported out of the catalytic zone together with the reaction products and the hydrogen sulphide depleted gas. However, in case of very high hydrogen sulphide concentrations it may be preferably to provide additional means of cooling.

Cooling can be achieved by any suitable cooling means. Alternatively, the hydrogen sulphide and sulphur dioxide may be contacted with the catalyst in the presence of an inert liquid. The heat released by the exothermic oxidation reaction may at least partly be absorbed by the inert liquid medium, thereby maintaining the temperature below temperature at which a significant viscosity increase due to sulphur polymerization takes place, i.e. at most 160° C.

The inert liquid medium may be any liquid medium that is not substantially consumed under the process conditions and that does not substantially degrade the oxidation catalyst. At least part of the inert liquid medium should be in liquid form at the process conditions in order to be able to control the process temperature and to remove the sulphur formed from the reaction zone. The inert liquid medium may be the liquid sulphur reaction product of the selective oxidation reaction (1). The inert liquid medium may also be another liquid compound that is not substantially consumed under the process conditions. Examples of such liquids are paraffins like n-pentane, n-hexane, n-heptane, n-octane and mixtures thereof, refinery hydrocarbon streams such as naphtha or kerosine, crude oil, toluene, alkanol amines and sulfinol.

The inert liquid medium is preferably elemental sulphur. Liquid sulphur is a particular suitable inert liquid medium, because it avoids the need for separation of sulphur from the inert liquid medium and the inevitable separation losses.

Such liquid medium may be provided directly to the reaction zone. An advantage of the use of such a liquid medium is that it may serve a dual purpose, i.e. absorbing heat and removing the liquid sulphur formed from the Claus catalyst.

The hydrogen sulphide-containing feed gas supplied to the process may also comprise mercaptans. In addition to the hydrogen sulphide, any mercaptans present in the gaseous stream may also be converted. Reference herein to mercaptans (RSH) is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially involves removal of methyl mercaptan (R=methyl), ethyl mercaptan (R=ethyl), normal- and iso-propyl mercaptan (R=n-propyl and iso-propyl) and butyl mercaptan (R=butyl) isomers.

Without wishing to be bound by any specific theory on mercaptan removal, it is believed that mercaptans, in particular methyl mercaptans, may be converted to hydrogen sulphide and polysulphides over the catalyst, preferably a $TiO_2$-comprising catalyst, by reacting with any liquid sulphur present. This may be produced sulphur or added sulphur. If no sulphur is added at the start of the process, initially no mercaptans will be converted. Mercaptan conversion will be initiated as soon as liquid sulphur has been produced. Any hydrogen sulphide formed during the conversion of the mercaptans is subsequently reacted with sulphur dioxide to elemental sulphur and water. The polysulphides are removed with the liquid sulphur or in case an inert liquid is present with the inert liquid, in particular when the inert liquid comprises elemental sulphur. In addition, it is believed that in particular the higher mercaptans may also be absorbed into the essentially liquid sulphur obtained, and removed therewith from the reaction zone. The removal of mercaptans, in particular the methyl mercaptans, provides the process of the present invention with an additional advantage over known Claus processes, wherein conversion of the mercaptans is less straightforward. Often, mercaptans are excluded from the hydrogen sulphide stream to the Claus reactor and thus need to be removed from the hydrocarbon feedstock in a separate process.

In addition to mercaptans also any COS or $CS_2$ present in the hydrogen sulphide-containing feed gas to step (i) may be converted in case a $TiO_2$-comprising Claus catalyst is used. Without wishing to be bound by any specific theory on the conversion of COS or $CS_2$, it is believed that, contrary to processes wherein an alumina based catalyst is used, these compounds are catalytically hydrolysed with water in the presence of the $TiO_2$-comprising catalyst to carbon dioxide and hydrogen sulphide. The water required for the catalytic hydrolysis is provided by the reaction of hydrogen sulphide and sulphur dioxide.

$CS_2$ may also be formed in the reaction zone due to the reaction of methane or other hydrocarbon species present in the feed gas with sulphur. It is an advantage of the process according to the invention that $CS_2$ formed in the reaction zone is catalytically hydrolysed in case a $TiO_2$-comprsing Claus catalyst is used to carbon dioxide and hydrogen sulphide. The same is valid for any COS formed during the process.

The liquid sulphur formed and the hydrogen sulphide-depleted gas or product gas may be removed from the reaction zone separately or as a gas-liquid mixture. Preferably, in case of the presence of an inert liquid, a gas-liquid mixture comprising a gaseous stream depleted in hydrogen sulphide and inert liquid medium with the sulphur formed dissolved in it, mixed with it or finely dispersed in it, is removed from the catalytic zone. The gas and liquid are separated into a gaseous stream depleted in hydrogen sulphide and a liquid stream comprising the liquid inert medium and sulphur. The liquid stream may comprise more than one liquid phase, for example a phase of inert liquid and a separate phase comprising liquid sulphur.

The gaseous stream or product gas may optionally be further treated to remove components like residual water, sulphur dioxide, COS and/or hydrogen sulphide by means known in the art.

The reaction zone of the process according to the invention may comprise two or more catalytic zones of oxidation catalyst in series. During normal operation the beds are operated according to step (i) of the process according to the invention, while intermittently one or more of the catalytic zones are operated according to step (ii) of the process according to the invention to remove $SO_4^{2-}$ anions from the sulphated catalyst. Preferred embodiments of such processes employing multiple catalytic zones may include for instance an embodiment, wherein a catalytic zone is operated according to step (ii), whereby a hydrogen sulphide-containing feed gas is used to form at least part, preferably essentially all, of the reducing atmosphere. The feed gas, which is at least to an extent depleted in hydrogen sulphide, or if present hydrogen, due to the reaction with $SO_4^{2-}$ anions, exits the catalytic zone and is subsequently provided to one or more catalytic zones operated according to step (i) of the process according to the invention to convert any remaining hydrogen sulphide.

As a result, the process can be operated continuously at high hydrogen sulphide conversion.

Another preferred embodiment may include using a hydrogen sulphide-containing hydrogen feed gas, whereby the hydrogen sulphide is first converted in one or more catalytic zones operated according to step (i) of the process and at least part of the obtained hydrogen sulphide-depleted hydrogen feed gas is used to form at least part of the reducing atmosphere for one or more catalytic zones operated according to step (ii) of the process according to the invention.

Irrespective of any particular design of the process, any small amounts of hydrogen sulphide still present in the product gas may be removed using an amine-based absorption unit.

In addition, the use of several catalytic zones in series is advantageous in the case of a feed gas having a high content of hydrogen sulphide. In that case, several catalytic zones in series can provide for the possibilities of interstage cooling, interstage water separation, staged supply of feed gas or of sulphur dioxide-containing gas or a combination of two or more thereof.

Irrespective of the number of catalytic zones, it is preferred to initiate step (ii) at such a time that no significant loss of hydrogen sulphide and/or sulphur dioxide conversion is yet observed. Preferably, step (ii) is initiated upon reaching a decrease in hydrogen sulphide conversion of 10% or more, based on the hydrogen sulphide conversion at the start of step (i). Preferably, a decrease of the hydrogen sulphide conversion of 2%, more preferably 0.5%, even more preferably 0.1% or more, based on the hydrogen sulphide conversion at the start of step (i).

Equally preferred, step (ii) is initiated upon reaching a decrease in sulphur dioxide conversion of 10% or more, based on the sulphur dioxide conversion at the start of step (i). Preferably, a decrease of the hydrogen sulphide conversion of 2%, more preferably 0.5,% even more preferably 0.1% or more, based on the sulphur dioxide conversion at the start of step (i).

By following the conversion of the hydrogen sulphide and/or sulphur dioxide at least during step (i) of the process the onset of catalyst sulphation can be predicted and a decision can be made when to initiate step (ii) of the process according to the invention. Preferably, at least the conversion of the component that is expected to be completely consumed in the reaction is followed. For example, in case of an excess of hydrogen sulphide, at least the sulphur dioxide conversion is followed.

In case a $TiO_2$-comprising catalyst is used, it is also possible to use the conversion of COS as an indicator for determining when to initiate step (ii) of the process according to the invention. Following the COS conversion rather than the hydrogen sulphide or sulphur dioxide has the advantage that the COS conversion is very sensitive to sulphation of the catalyst and a decrease in COS conversions can be observed significantly before hydrogen sulphide and/or sulphur dioxide conversions are affected. As such, a decrease in COS conversion can be seen as an early indicator of catalyst sulphation.

Therefore, the process preferably includes during step (i), analysing the hydrogen sulphide, sulphur dioxide and/or COS conversion in time, by determining the content of hydrogen sulphide, sulphur dioxide and/or COS conversion in the gaseous effluent of a catalytic zone and comparing this to the hydrogen sulphide, sulphur dioxide and/or COS content in the gaseous effluent of the same catalytic zone at the start of step (i). In case of a fluctuating hydrogen sulphide, sulphur dioxide and/or COS content in the gases provided to a catalytic zone, it is also possible to compare the relative decrease in hydrogen sulphide, sulphur dioxide and/or COS content over the catalytic zone to the relative decrease obtained at the start of step (i). Alternatively, the hydrogen sulphide, sulphur dioxide and/or COS content of the product gas obtained from the reaction zone can be compared to the hydrogen sulphide, sulphur dioxide and/or COS content of the product gas obtained from the reaction zone obtained at the start of step (i). The hydrogen sulphide, sulphur dioxide and/or COS content can be determined using gas analysis means known in the art.

The process according to the present invention is very suitably for the removal of hydrogen sulphide from gaseous streams having a relatively high content of hydrogen sulphide, i.e. up to 80 volume %. Preferably, the hydrogen sulphide-containing feed gas comprises hydrogen sulphide in the concentration of from 0.1 to 50 volume %, more preferably of from 1 to 25 volume %, based on the total volume of the hydrogen sulphide-containing feed gas.

The hydrogen sulphide-containing feed gas is preferably supplied to one or more of the catalytic zones operated according to step (i) of the process in the reaction zone at a gas hourly space velocity in the range of from 100 to 100,000 Nl/kg/h (normal litres of gas per kilogram of catalyst in that zone per hour), more preferably of from 150 to 50,000 Nl/kg/h, even more preferably of from 200 to 5,000 Nl/kg/h. Reference herein to normal litres is to litres of gas at conditions of Standard Temperature and Pressure, i.e. 0° C. and 1 atmosphere.

The catalyst may be any Claus catalyst. Preferably, the catalyst is an $Al_2O_3$-comprising catalyst or a $TiO_2$-comprising catalyst. The $Al_2O_3$-comprising catalyst is more sensitive to sulphation, and therefore requires more frequent exposure to the reducing atmosphere of step (ii). The most preferred catalyst is a $TiO_2$-comprising catalyst as this catalyst is less sensitive to sulphation and in addition, this catalyst has a high temperature stability, which is particular beneficial in case of intended or unintended temperature rises in the reactor.

Optionally, the catalyst may comprise promoters for the hydrolysis reaction such as K.

Each catalytic zone in the reaction zone of the process according to the invention may be in any form that is suitable for a three-phase reaction system, for example a packed catalyst bed reactor, a trickle flow fixed catalyst bed or, if sufficing liquid is present in the reaction zone, a slurry bubble column, i.e. a catalytic zone in the form of a slurry of particles of the catalyst in inert liquid medium. If the feed gas provided to step (i) has a very high hydrogen sulphide content, for example above 10%, it might be preferred to apply additional cooling of the reaction zone. Additional cooling may for example be achieved by using a catalytic zone in the form of a multi-tubular reactor with a fixed bed of oxidation catalyst particles inside the tubes or on the shell side of the tubes and supplying coolant to the other side of the tubes. In a slurry bubble column, additional cooling may be achieved by providing the bubble column with cooling coils.

The present invention can be used to selectively oxidize hydrogen sulphide from various gaseous streams, for example light hydrocarbons, such as methane, ethane, propane, and gases derived from such light hydrocarbons; natural gas; gases derived from tar sand and shale oils; gases associated with crude oil production; coal, methane or biomass derived synthesis gas; gases such as hydrogen or mixtures of hydrogen (e.g. $H_2$ and CO and/or $CO_2$).

Preferably, the hydrocarbon and/or hydrogen feed gas, comprises at least 10 vol %, more preferably 25 vol %, even more preferably 50 vol % of hydrocarbons and/or hydrogen, based on the total volume of the hydrocarbon or hydrogen feed gas. More preferably, the hydrocarbon or hydrogen feed gas comprises in the range of from 10 to 99.9 vol % of hydrocarbons or hydrogen, more preferably in the range of from of 40 to 99.5 vol %, even more preferably in the range of from 50 vol % to 99 vol % of hydrocarbons or hydrogen.

The feed gas may further comprise nitrogen, carbon dioxide, carbon monoxide, argon, helium and other inert gases.

The hydrogen sulphide-comprising feed gas may comprise other sulphur compounds such as mercaptans, typically in the range of from 0.1 ppmV to 5 vol % (based on the total volume of the feed gas), COS, typically in the range of from 0.1 to 5000 ppmV (based on the total volume of the feed gas), more typically of from 0.1 to 2500 ppmV, and/or $CS_2$. The overall molar ratio of sulphur dioxide in the sulphur dioxide-containing gas and hydrogen sulphide in the feed gas that are supplied in step (i) to the reaction zone is preferably in de range of from 0.1 to 10, more preferably 0.2 to 3.0, even more preferably of from 0.3 to 1.5. In case, the reaction zone comprises more than one catalytic zone the molar ratio of sulphur dioxide and hydrogen sulphide provided to each catalytic zone may be much lower.

Preferably, the molar ratio of sulphur dioxide to hydrogen sulphide provided to step (i) of the process is slightly below the stoichiometric molar ratio of 0.5, preferably of from 0.2 to 0.49, even more preferably of from 0.3 to 0.49. In that case, some hydrogen sulphide will remain in the product gas, however this can be remove more conveniently than sulphur dioxide. Suitable means for removing the remaining hydrogen sulphide include, but are not limited to, for instance an amine-based absorption unit or an absorption bed comprising solid scavenger, e.g. zinc oxide. Other scavenger compounds including liquid scavengers and chelating agents, e.g. polymeric amino alcohols, iron oxide, $Fe^{3+}$ (EDTA), that are suitable as hydrogen sulphide absorbent are known in the art.

When an absorbent is substantially saturated with hydrogen sulphide, it may be regenerated and reused.

Such absorption processes are well known in the art.

If the product gas still comprises sulphur dioxide, it might be preferred to remove such sulphur dioxide from this gas stream and, optionally, recycle such sulphur dioxide back to the reaction zone. This may for example be done by leading the gas stream over an absorption bed comprising a hydrated iron sulphide compound or another metal sulphide compound that is converted to its oxide and elemental sulphur upon contacting it with sulphur dioxide. Such metal sulphide compounds that are suitable as sulphur dioxide absorbent are known in the art.

At least part of or, preferably, all of the sulphur dioxide in the sulphur dioxide-containing gas may be obtained by combusting at least part of the elemental sulphur obtained from the process. Depending on the desired sulphur dioxide concentration in the sulphur dioxide-containing gas, the obtained sulphur may be combusted using pure oxygen, air or oxygen-enriched air.

If pure oxygen is used to combust the elemental sulphur, a pure sulphur dioxide gas is obtained. In order to omit the need to separate air to provide oxygen-enriched air or pure oxygen it is preferred to use air to combust the sulphur. The resulting combustion product is a gaseous mixture comprising predominantly sulphur dioxide, nitrogen and optionally residual oxygen (further also referred to as gas effluent or combustion gas effluent). This gaseous mixture may be separated or concentrated to increase the sulphur dioxide content, e.g. by removing the nitrogen. The sulphur dioxide can be concentrated by any process know in the art such as for example by using liquid absorption, e.g. the CanSolv process, adsorption, membrane separation or by condensation of the sulphur dioxide. Sulphur dioxide condenses at much higher temperatures, i.e. at approximately −10° C., than for instance nitrogen. Due to the high condensation temperature of sulphur dioxide, the post combustion separation of sulphur dioxide and nitrogen is preferred to the pre combustion separation of oxygen and nitrogen.

A most preferred manner for sulphur dioxide concentration is by contacting the gas effluent comprising sulphur dioxide (i.e. the mixture comprising sulphur dioxide and nitrogen) with an absorbing liquid for sulphur dioxide in a sulphur dioxide absorption zone to selectively transfer sulphur dioxide from the combustion gas effluent to the absorbing liquid to obtain sulphur dioxide-enriched absorbing liquid and subsequently stripping sulphur dioxide from the sulphur dioxide-enriched absorbing liquid to produce a lean absorbing liquid and the sulphur dioxide-containing gas.

One preferred absorbing liquid for sulphur dioxide comprises at least one substantially water immiscible organic phosphonate diester.

Another preferred absorbing liquid for sulphur dioxide comprises tetraethyleneglycol dimethylether.

Yet another preferred absorbing liquid for sulphur dioxide comprises diamines having a molecular weight of less than 300 in free base form and having a pKa value for the free nitrogen atom of about 3.0 to about 5.5 and containing at least one mole of water for each mole of sulphur dioxide to be absorbed.

Stripping of sulphur dioxide from the sulphur dioxide-enriched absorbing liquid is usually done at elevated temperature. To provide a more energy-efficient process, steam generated in a heat recovery steam generator unit can be used to provide at least part of the heat needed for the stripping of sulphur dioxide from the sulphur dioxide-enriched absorbing liquid. The heat recovery steam generator unit can be any unit providing means for recovering heat from the hot exhaust gas and converting this heat to steam. For example, the heat recovery steam generator unit can comprise a plurality of tubes mounted stack-wise. Water is pumped and circulated through the tubes and can be held under high pressure at high temperatures. The hot exhaust gas heats up the tubes and is used to produce steam.

Suitably, the heat recovery steam generator unit can be designed to produce three types of steam: high pressure steam, intermediate pressure steam and low pressure steam. Preferably, the steam generator is designed to produce at least a certain amount of high pressure steam, because high pressure steam can be used to generate power. Suitably, high-pressure steam has a pressure in the range of from 90 to 150 bar (absolute), preferably from 90 to 125 bar (absolute), more preferably from 100 to 115 bar (absolute). Suitably, low-pressure steam is also produced, the low-pressure steam preferably having a pressure in the range of from 2 to 10 bar (absolute), more preferably from to 3 to 8 bar (absolute), still more preferably from 4 to 6 bar (absolute). This low-pressure steam is used for the regeneration of the absorbing liquid comprising sulphur dioxide.

It is an advantage of the process according to the invention that the heat released during the exothermic oxidation of the sulphur can be used to produce electricity. The sulphur is combusted in the presence of oxygen and the hot combustion gas is used to generate power, thereby producing a gas effluent comprising sulphur dioxide. Suitably, combustion takes place in a combustion chamber, for example a combustion chamber of a gas turbine. The oxygen can originate from an oxygen-containing gas, which is supplied to the combustion chamber of the gas turbine.

In a preferred embodiment, using the hot combustion gas to generate power involves expanding the hot combustion gas in a gas turbine, usually via a sequence of expander blades arranged in rows, and using the expanded combustion gas to generate power via a generator. Hot exhaust gas is emitted from the gas turbine. Suitably, the hot exhaust gas has a temperature in the range of from 350 to 700° C., preferably from 400 to 650° C. The composition of the hot exhaust gas can vary, depending on the oxidant used to combust the sulphur. Generally, the hot exhaust gas will comprise sulphur dioxide, and optionally nitrogen and carbon dioxide. The hot exhaust gas exiting the gas turbine may be processed further to recover heat. If the hot exhaust gas exiting the gas turbine is not further processed, it may be used as or as part of the sulphur dioxide-containing gas.

In a preferred embodiment, hot exhaust gas exiting the gas turbine is introduced into to a heat recovery steam generator unit, where heat contained in the hot exhaust gas is used to produce a first amount of steam. In this embodiment, the gas effluent exiting the heat recovery steam generator unit may be used as or as part of the sulphur dioxide-containing gas.

The gas effluent comprising sulphur dioxide may be subjected to a sulphur dioxide concentration step, thereby generating a sulphur dioxide-containing gas stream.

The produced electricity can be used to produce oxygen enriched air, pure oxygen or may be used to provide energy for the separation of sulphur dioxide and nitrogen. Therefore, contrary to prior art processes there is no need or at least a reduced need to combust part of the valuable natural gas to produce energy.

The sulphur dioxide concentration in the sulphur dioxide-containing gas provided to step (i) of the process is not critical. It will be appreciated that the preferred sulphur dioxide concentration depends primarily on the concentration of the hydrogen sulphide in the hydrogen sulphide-containing gas. In the case of a very high content of hydrogen sulphide in the feed gas it is preferred to either use pure or substantially pure sulphur dioxide, in order to avoid a high concentration of nitrogen or other gases in the hydrogen sulphide depleted gas.

In step (i) of the process according to the invention, the temperature in the reaction zone, or if the reaction zone comprises one or more catalytic zones, each catalytic zone, is at least 120° C., but at most 160° C., preferably the temperature is in the range of from 120 to 150° C., more preferably of from 120 to 135° C., even more preferably of from 125 to 135° C., at a temperature above 120° C., the hydrolysis reaction of COS is enhanced in the presence of a $TiO_2$-comprising catalyst. Due to the exothermicity of the reaction between hydrogen sulphide and sulphur dioxide it is preferred to maintain the temperature as low as possible, while maintaining a temperature above 120° C. At these relatively low temperatures, a higher conversion is obtained by drawing the equilibrium to the product side.

Step (i) of the process according to the present invention is operated at elevated pressure. An elevated pressure is required to provide a driving force, which allows to reactants to pass through the liquid sulphur formed at the catalyst interface. The process is operated at a pressure in the range of from 4 to 200 bar (absolute), preferably 10 to 150 bar (absolute), more preferably in the range of from 10 to 100 bar (absolute). Most preferably, the operating pressure is in the range of from 10 to 90 bar (absolute). Such elevated pressures ensure that the reactants can still reach the catalyst surface because at elevated pressure the sulphur dioxide and hydrogen sulphide dissolve in the liquid sulphur and can reach the active surface of the catalyst, contrary to the prior art Claus process where the pressure is too low, i.e. near atmospheric. Too high pressures will induce the condensation of produced water. It will be appreciated that the exact choice of temperature and pressure in step (i) is influenced by the partial pressure of produced water in the reaction zone.

Preferably, the pressure is chosen such that the feed gas can be used without the need to pre-pressurise or pre-depressurise the feed gas. It is an advantage of the process of the invention that hydrogen sulphide containing gas can be processed at the pressure at which it is produced or at which it becomes available. Natural gas can for example be processed at the pressure at which it is produced at the well and effluents from a hydroprocessing or gasification unit can be processed without depressurizing them.

DETAILED DESCRIPTION OF THE DRAWINGS

In FIG. 1 is shown a reaction zone 1 having a single catalytic zone 2 in the form of a fixed bed of TiO$_2$-catalyst. During step (i) of the process according to the invention, a hydrogen sulphide-containing hydrocarbon and/or hydrogen feed gas 3 and a stream 4 of sulphur dioxide-containing gas are supplied to catalytic zone 2. In catalytic zone 2, the hydrogen sulphide is selectively oxidized to liquid sulphur at a temperature in the range of from 120 to 160° C. and at elevated pressure. Effluent 6 is discharged from catalytic zone 2 and separated in gas/liquid separator 7 into a gaseous stream 8 of hydrogen sulphide depleted gas and a stream 9 comprising sulphur. A stream 11 of sulphur is discharged from the process. The sulphur in stream 9 is provided to sulphur combustor 15 and is combusted with air 17. Stream 19 comprising at least sulphur dioxide and nitrogen is provided to sulphur dioxide concentration unit 21. Concentrated stream 4 comprising sulphur dioxide-containing gas exits sulphur dioxide concentration unit 21. The remainder of stream 19 exits the sulphur dioxide concentration unit 21 via stream 23. During step (ii) of the process according to the invention the supply of sulphur dioxide via line 4 is halted. This can be done for instance by a valve (not shown) provided in the conduit for stream 4.

Gas analysis means (not shown) may be provided in the conduits for streams 3 and 4 and steam 6 or optionally 8.

Figure 2:
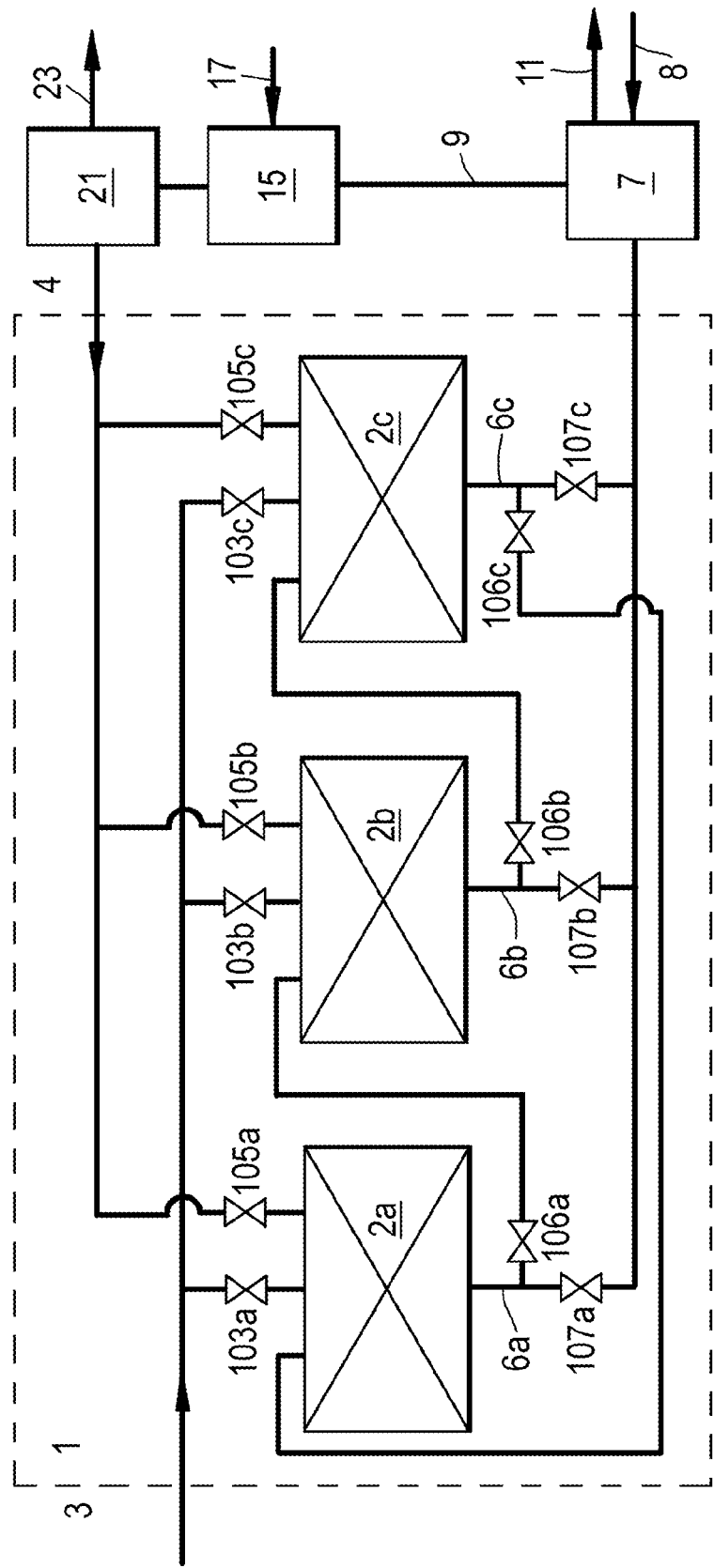
In FIG. 2, another process scheme is shown suitable for performing the process according to the invention.

In FIG. 2 is shown a reaction zone 1 having three catalytic zones 2a-2c is series, wherein each zone 2a-2c is in the form of a fixed bed of oxidation catalyst. In FIG. 2, an embodiment of the invention is shown, wherein any two of catalytic zones 2a, 2b and 2c may operated according to step (i) of the process according to the invention and one catalytic zone is operated according to step (ii) of the process according to the invention. A hydrogen sulphide-containing hydrocarbon and/or hydrogen-containing feed gas 3 and a stream 4 of sulphur dioxide-containing gas, are supplied to reaction zone 1. Feed gas 3 may be supplied to either one of the catalytic zones depending on which of valves 103a, 103b or 103c is open. Stream 4 is split in three sub-streams 4a, 4b and 4c. The flow of each of stream 4a, 4b, and 4c to the respective catalytic zones 2a, 2b and 2c may be stopped by closing valve 105a, 105b or 105c, respectively.

The respective effluent 6a, 6b and 6c of each catalytic zone 2a, 2b and 2c may be redirected to a further catalytic zone via respective valves 106a, 106b or 106C. Alternatively, effluent 6a, 6b and 6c may be sent to gas/liquid separator 7 via respective valves 107a, 107b or 107C. Depending on which of the catalytic zones is operated according to step (ii) of the process of the invention, the mentioned valves can be open or closed such that the other catalytic zones may be operated according to step (i) of the process. Among others, the following non-limiting valve settings may be considered:

| Schedule A | | | | | |
|---|---|---|---|---|---|
| Catalytic zone | Operated according to step | Valve | a | b | c |
| 2a | (ii) | 103 | closed | closed | open |
| 2b | (i) | 105 | closed | open | open |
| 2c | (i) | 106 | open | closed | open |
|  |  | 107 | closed | open | closed |
| 2a | (i) | 103 | open | closed | closed |
| 2b | (ii) | 105 | open | closed | open |
| 2c | (i) | 106 | open | open | closed |
|  |  | 107 | closed | closed | open |
| 2a | (i) | 103 | closed | open | closed |
| 2b | (i) | 105 | open | open | closed |
| 2c | (ii) | 106 | closed | open | open |
|  |  | 107 | open | closed | closed |

The valve settings in Schedule A provide an process operation using three consecutive catalytic zones, wherein the second consecutive catalytic zone is operated according to step (ii), while the remaining catalytic zones are operated according to step (i). It is of course also possible to operate the first catalytic zone, i.e. the catalytic zone wherein the feed first enters, according to step (ii), while the remaining catalytic zones are operated according to step (i). Also the third consecutive catalytic zone may be operated according to step (ii). The effluent of the third zone exits reaction zone 1 upon exiting the third consecutive catalytic zone. In that case, preferably, additional hydrogen sulphide removal means are provided to remove at least part of any residual hydrogen sulphide remaining in the effluent exiting reaction zone 1.

Alternatively, it is also possible to operate two catalytic zones simultaneously according to step (ii) of the process according to the invention.

If desired each catalytic zone may be provided with means (not shown) to separately withdraw sulphur from each catalytic zone.

In case for instance, catalytic zone 2b is operated according to step (ii) of the process valve 105b may be closed. In addition, valves 103b, 103c, valve 106c and valves 107 and 107b may be closed (see schedule A).

Feed gas 3 is supplied to catalytic zone 2a of the remaining catalytic zones. Together with feed 3, sub-stream 4a of stream 4 of sulphur dioxide-containing gas is provided to catalytic zone 2a. A second part of the stream 4 of sulphur dioxide-containing gas, i.e. sub-stream 4c, is supplied to the catalytic zone 2c, together with effluent 6b from zone 2b.

In catalytic zone 2a and 2c, hydrogen sulphide is selectively oxidized with the sulphur dioxide, to liquid sulphur at a temperature in the range of from 120 and below 160° C. and at elevated pressure. Effluent 6c is discharged from catalytic zone 2c and separated in gas/liquid separator 7 into a gaseous stream 8 of hydrogen sulphide-depleted gas and a stream 9 of liquid sulphur. A stream 11 of sulphur is discharged from the process. The sulphur in stream 9 of sulphur is provided to sulphur combustor 15 and is combusted with air 17. Stream 19 comprising at least sulphur dioxide and nitrogen is provided to sulphur dioxide concentration unit 21. Concentrated stream 4 of sulphur dioxide-containing gas exits sulphur dioxide concentration unit 21. The remainder of stream 19 exits the sulphur dioxide concentration unit 21 via stream 23.

In the embodiment shown in FIG. 2, valve 105b is closed. Therefore, only hydrogen sulphide containing effluent 6a of catalytic zone 2a is provided to catalytic zone 2b. Optionally, effluent 6a is heated prior to entering catalytic zone 2b in a separate heat exchanger (not shown) to increase the temperature of effluent 6a to a temperature in the range of from 160 to 300° C. At least part of any sulphated catalyst, e.g. $TiO(SO_4)$, in catalytic zone 2b is contacted with the reducing atmosphere formed by hydrogen sulphide containing effluent 6a and reduced to $TiO_2$. Effluent 6b exiting catalytic zone 2b is provided to catalytic zone 2c.

Gas analysis means (not shown) may be provided in the conduits for streams 3, 6a, 6b and 6c or, optionally, 8 and stream 4a, 4b, and 4c.

EXAMPLES

The invention will be illustrated by the following non-limiting examples.

Example 1

Illustrative

In this example hydrogen sulphide and sulphur dioxide are contacted with an $TiO_2$-comprising catalyst in the presence of methane. The conversion of hydrogen sulphide and sulphur dioxide is followed as a function of time.

Experimental Set-Up:

The experiment was conducted in quartz reactor, which was made in one piece from borosilicate glass. A filter was inserted to prevent the loss of catalyst. The reactor was in a down-flow configuration, where the gas flow was added from the top of the reactor and the effluents removed from the bottom.

In order to prevent premature reaction upstream of the reactor, the input of sulphur dioxide and hydrogen sulphide was separated until within the reactor by means of concentric feed pipes. The gases were then mixed in a chamber above the filter before passing through the reactor section.

The reactor had an internal diameter of 0.02 m and a height of 0.075 m.

The whole reactor was placed in an oven set to control the temperature.

Catalyst:

The catalyst was $TiO_2$ (P25), provided in the form of particles. The catalyst particles had a pore volume of approximately 0.3 ml/gram. The catalyst particles were combined with inert SiC particles to create a catalyst bed with well defined flow properties. The resulting catalyst bed had a volume of 24 ml of which 3.8 ml (4 gr) was catalyst.

Analysis:

The off-gas from the reactor was analyzed using an online GC. The GC system incorporated three separate detectors (Pulse Discharge and two Thermal Conductivity) with three separate columns (Mol sieve 5A, GasPro and Porapack Q).

A gaspro column/PDD combination was used to detect and quantify hydrogen sulphide, sulphur dioxide, COS and $CS_2$ content (at low concentrations).

A PorapackQ/TCD combination was used to detect and quantify hydrogen sulphide, sulphur dioxide, CO2 and COS and water content (at high concentrations).

A Mol sieve/TCD combination was used to detect and quantify methane and nitrogen content.

Sulphation of the catalyst was analysed by X-ray diffraction (XRD), X-ray fluorescence (XRF), aqueous extraction and by ion chromatography.

Feed to the Process:

The hydrogen sulphide was provided in the form of a 1.4 vol % (based on the total volume on the mixture) hydrogen sulphide in methane mixture. The sulphur dioxide was provided as a 0.69 vol % (based on the total volume on the mixture) sulphur dioxide in methane mixture. The hydrogen sulphide/methane mixture additionally comprised small quantities (below 10 ppmV) of COS.

Process:

The reactor was pressurized using a nitrogen flow. At the start to the experiment the nitrogen flow was replaced by the reactants. Hydrogen sulphide and sulphur dioxide were supplied to the reactor separately. The total flow rate was set to 9 Nl/hr (GVSH: 2400 $h^{-1}$). The temperature was controlled to be 130° C. in the reactor. The temperature of the off-gas from the reactor was maintained at 110° C. until it reached the back pressure regulator in order to prevent water condensation. The sulphur dioxide to hydrogen sulphide ratio was controlled slightly above the stoichiometric ratio of 0.5, such that the process was operated in the presence of excess of 200 ppmV hydrogen sulphide.

Results:

The results of Example 1 are shown in Table 1. Initially, essentially no sulphur dioxide could be detected in the off gas from the reactor thus implying full conversion in sulphur dioxide. Hydrogen sulphide conversion, after correction for the hydrogen sulphide excess, was measured to be above 99.9%.

Starting from approximately 300 hours, sulphur dioxide was detected in the off-gas from the reactor. The sulphur dioxide concentration increased an reached approximately 40 ppmV at 500 hours. Additionally, COS appeared in the off-gas already at 200 hours.

Following the experiment, the catalyst was isolated from the reactor and washed with toluene to remove any residual elemental sulphur. Using XRD it could be shown that no structural modification of the catalyst had taken place. Furthermore, XRF analysis showed the presence of sulphates on the surface of the catalyst. The identity of the sulphur species as sulphates was confirmed by aqueous extraction followed by ion chromatography analysis.

Example 2

Illustrative

A purposely sulphated $TiO_2$-comprising catalyst was prepared by exposing the catalyst to an sulphur dioxide comprising oxidative atmosphere.

The experiments were conducted in a set-up similar to that of Example 1, whereby the reactor had an internal diameter of 0.012 m and a height of 0.21, having a total reactor volume of 100 ml.

The catalyst was $TiO_2$ (P25), provided in the form of particles. The catalyst particles had a pore volume of approximately 0.3 ml/gram. The reactor was filled with catalyst particles, providing a catalyst bed having a volume of 27 ml (25 gr) $TiO_2$ catalyst.

An oxidative atmosphere was provided by supplying a 1 vol % (based on the total volume on the mixture) sulphur dioxide in nitrogen mixture and a 1.5 vol % (based on the total volume on the mixture) oxygen in nitrogen mixture to the reactor.

The reactor was pressurized using a nitrogen flow. At the start to the experiment the nitrogen flow was replaced by the reactants. Prior to replacing the nitrogen flow by the reactive gasses, the catalyst was dried at 450° C. for 3 hours, to remove any water present.

Sulphur dioxide and oxygen were supplied to the reactor separately. The total flow rate was 9.5 Nl/hr. Upon entry into the reactor the oxidative atmosphere comprised 1 vol % sulphur dioxide and 1.5 vol % oxygen, based on the total volume of the oxidative atmosphere provided. The experiment was conducted at 300° C. and at 1.2 bara.

The temperature of the off-gas from the reactor was maintained at 110° C. until it reached the back pressure regulator in order to prevent water condensation.

The off gases and catalyst were analysed as described in Example 1.

The sulphation of the $TiO_2$ catalyst was monitored via the consumption of sulphur dioxide and oxygen.
Result:

After 6 hours, consumption of sulphur dioxide and oxygen essentially ceased. The catalyst was removed from the reactor and analysed to determine the extent of sulphation. XRF and ion chromatography showed the presence of sulphates on the surface of the catalyst, no sulphation of $TiO_2$ below the surface was detected. Based on the weight increase (approximately 1 wt %), it was concluded that a monolayer of sulphates was created on the surface of the catalyst.

Example 3

Illustrative

Using the sulphated $TiO_2$ prepared in Example 3, a new catalyst bed as described in Example 1 was prepared and the process of Example 1 was repeated.
Result:

The results of Example 2 are shown in Table 1. A strong increase of the sulphur dioxide and hydrogen sulphide concentration in the off gas compared to the initial phase (below 300 hours) of Example 1 is observed. The concentration of sulphur dioxide in the off gas has increased to over 400 ppmV, showing the decreased activity of the catalyst upon sulphation. This is further exemplified by the decrease of the hydrogen sulphide conversion, after correction for the hydrogen sulphide excess, to almost 93%.

Example 4

Using the reactor as described in Example 2, the pre-sulphated catalyst obtained in Example 2 was contacted with a reducing atmosphere to remove the anionic sulphates.

The pre-sulphated catalyst obtained in Example 2 was used to from a catalyst bed, the catalyst bed having a volume of 2.2 ml (2 gr) pre-sulphated catalyst.

An reducing atmosphere was provided by supplying a 0.1 vol % (based on the total volume on the mixture) hydrogen sulphide in nitrogen mixture to the reactor.

The reactor was pressurized using a nitrogen flow. At the start to the experiment the nitrogen flow was replaced by the reactants. Prior to replacing the nitrogen flow by the reactive gasses, the catalyst was dried at 250° C. for 6 hours, removing any physisorbed sulphur dioxide and water. Subsequently, the catalyst was cooled.

After cooling down to 50° C., the hydrogen sulphide/nitrogen mixture was provided to the reactor at a total flow rate of 0.7 Nl/hr and atmospheric pressure to provide the reducing atmosphere. The temperature was gradually increased to 300° C. over the course of 75 hours and the consumption of hydrogen sulphide monitored.

The temperature of the off-gas from the reactor was maintained at 110° C. until it reached the back pressure regulator in order to prevent water condensation.

The off gases and catalyst were analysed as described in Example 1.
Result:

Below 150° C. virtually no hydrogen sulphide is consumed. Above this temperature, hydrogen sulphide is consumed. The process is continued until no hydrogen sulphide is consumed any longer.

The total consumption of hydrogen sulphide corresponded to three equivalents based on the weight of the sulphate deposited on the surface in the Example 2.

Example 5

Using the catalyst obtained from Example 4, i.e. a desulphated catalyst, the process of Example 1 was repeated for 50 hours.
Results:

The results obtained are shown in Table 1. Essentially no sulphur dioxide could be detected in the off gas from the reactor indicating that all sulphur dioxide was converted. It can be concluded that activity of the catalyst was restored. Hydrogen sulphide conversion, after correction for the hydrogen sulphide excess, was above >99.9%. Also the activity towards the hydrolysis of COS to $CO_2$ was restored.

TABLE 1

|  | Time hours | $H_2S$ in off-gas ppmV | $SO_2$ in off-gas ppmV | COS in off-gas | $H_2S$ conversion* % | $SO_2$ conversion % |
|---|---|---|---|---|---|---|
| Example 1 | 21 | 350 | <2 | No | >99.9 | >99.9 |
|  | 102 | 150 | <2 | No | >99.9 | >99.9 |
|  | 154 | 32 | <2 | NO | >99.9 | >99.9 |
|  | 200 | 200 | <2 | Yes | >99.9 | >99.9 |
|  | 245 | 200 | <2 | Yes | >99.9 | >99.9 |
|  | 303 | 220 | 7 | Yes | 99.9 | 99.9 |
|  | 403 | 195 | 25 | Yes | 99.6 | 99.6 |
|  | 500 | 232 | 37 | Yes | 99.5 | 99.5 |
| Example 3 | 4 | 990 | 336 | Yes | 95.1 | 95.2 |
|  | 7 | 980 | 454 | Yes | 93.5 | 93.5 |
|  | 9 | 960 | 401 | Yes | 94.2 | 94.2% |
| Example 5 | 3 | 890 | <2 | No | >99.9 | >99.9 |
|  | 25 | 390 | <2 | No | >99.9 | >99.9 |
|  | 45 | 380 | <2 | No | >99.9 | >99.9 |

*corrected for the hydrogen sulphide excess, relative to the stoichiometric ratio, in the feed to the reactor.

What is claimed is:
1. A process for the selective oxidation of hydrogen sulphide in a hydrogen sulphide-containing feed gas, comprising a hydrocarbon or hydrogen or a combination thereof, to elemental sulphur in a reaction zone containing a Claus catalyst, comprising the steps of:

i) reacting in the reaction zone the hydrogen sulphide in the hydrogen sulphide-containing feed gas with sulphur dioxide at a pressure in the range of from 4 to 200 bar (absolute) and a temperature in the range of from 120 to 160° C., such that the elemental sulphur formed is essentially in liquid form; and the Claus catalyst undergoes sulphation to form an anionic oxide of sulphur on the Claus catalyst to thereby provide a sulphated Claus catalyst, and ii) contacting the sulphated Claus catalyst with a reducing atmosphere under conditions so as to effectuate the reduction of the anionic oxide of sulphur.

2. A process according to claim 1, wherein a sequence comprising step (i) and subsequently step (ii) is repeated one or more times.

3. A process according to claim 1, wherein the Claus catalyst is a $TiO_2$-comprising catalyst.

4. A process according to claim 1, wherein the reducing atmosphere comprises at least one of hydrogen sulphide, hydrogen, carbon monoxide, ammonia or elemental sulphur.

5. A process according to claim 1, wherein the reducing atmosphere comprises a hydrogen sulphide-containing hydrocarbon gas.

6. A process according to claim 1, wherein the reducing atmosphere comprises a hydrogen-comprising gas.

7. A process according to claim 1, wherein the reducing atmosphere comprises at least a reducing agent or an oxidising agent, or both, in a molar ratio of oxidising agent to reducing agent in the range of from 0 to 0.4 times the stoichiometric ratio of oxidising agent to reducing agent.

8. A process according to claim 1, wherein the sulphated Claus catalyst is contacted in step (ii) with the reducing atmosphere at a temperature in the range of from 150 to 300° C.

9. A process according to claim 1, wherein the temperature of step (i) is in the range of from 125 to 150° C.

10. A process according to claim 1, wherein the sulphur dioxide and hydrogen sulphide are supplied to the reaction zone in a molar ratio of in the range of from 0.1 to 10.

11. A process according to claim 1, wherein the pressure in step (i) is in the range of from 10 to 150 bar (absolute).

12. A process according to claim 1, wherein the pressure in step (ii) is in the range of from 1 to 200 bar (absolute).

* * * * *